United States Patent [19]

Nishiguchi et al.

[11] Patent Number: 4,691,210

[45] Date of Patent: Sep. 1, 1987

[54] THERMAL HEAD FOR HEAT-SENSITIVE RECORDING

[75] Inventors: Yasuo Nishiguchi; Tsuyoshi Yasutomi, both of Kokubu; Ryoichi Shiraishi, Hayato, all of Japan

[73] Assignee: Kyocera Corporation, Kyoto, Japan

[21] Appl. No.: 812,970

[22] Filed: Dec. 24, 1985

[30] Foreign Application Priority Data

Dec. 25, 1984 [JP] Japan .......................... 59-201055[U]

[51] Int. Cl.[4] ........................................ G01D 15/10

[52] U.S. Cl. ............................... 346/76 PH; 219/543; 338/314

[58] Field of Search ................................... 346/76 PH; 338/307-309, 314; 219/543, 2.6 PH; 400/120; 250/317.1-318

[56] References Cited

U.S. PATENT DOCUMENTS 3,973,106 8/1976 Ura ..................................... 219/543

*Primary Examiner*—Arthur G. Evans

*Attorney, Agent, or Firm*—Spensley Horn Jubas & Lubitz

[57] ABSTRACT

In a thermal head comprising a plurality of heat-generating elements formed on a glaze layer on a substrate, grooves extending to the midway of the glaze layer in the thickness direction of the glaze layer and having a depth of 0.3 to 30 μm are formed in the surface portion of the glaze layer between every two adjacent heat-generating elements. This thermal head is improved in both the rising and falling response characteristics of the heat-generating temperature by the presence of these grooves, and sharp images having a high resolving power can be obtained.

7 Claims, 3 Drawing Figures

THERMAL HEAD FOR HEAT-SENSITIVE RECORDING

BACKGROUND OF THE INVENTION (1) Field of the Invention

The present invention relates to a thermal head to be used for heat-sensitive recording. More particularly, the present invention relates to a thermal head excellent in both the temperature rising and falling characteristics at the thermal recording.

(2) Description of the Prior Art

A conventional thermal head is formed, for example, by laminating on the surface of a glaze layer 12 on a substrate 11 heat-generating resistors 13*a* composed of tantalum nitride ($Ta_2N$), pairs of electrodes composed of aluminum or the like (only one electrode 13*b* is shown) and a protecting layer 14 composed of tantalum pentoxide ($Ta_2O_5$), as shown in FIG. 2. A certain voltage is applied to the heat-generating resistors 13*a* through the electrodes 13*b* to generate Joule heat selectively in the heat-generating resistors 13*a* to exert the function of the thermal head. The substrate 11 is formed of a ceramic such as alumina, and in order to improve the thermal response characteristics, the glaze layer 12 is formed of a glass composed mainly of silica ($SiO_2$) or the like. A heat-generating element 13 is constructed by the heat-generating resistor 13*a* and electrode 13*b*.

In this conventional thermal head, many heat-generating elements 13 are formed very adjacently to one another on the glaze layer 12, and Joule heat generated in one heat-generating element 13 has influences on the adjacent heat-generating element. Accordingly, in the case where the heat-generating element 13 is selectively actuated to generate heat, the printing density is changed according to whether or not heat is generated in the adjacent heat-generating element.

Furthermore, in the conventional thermal head, when one heat-generating element 13 is actuated to generate heat, the glaze layer 12 is heated not only in the portion just below this heat-generating element 13 but also in the surrounding portion. Accordingly, the heat capacity of the glaze layer 12 is much increased and the rising response characteristics for elevating the temperature of the heat-generating element 13 to a desired level necessary for printing are degraded.

As means for eliminating this defect of the conventional thermal head, there has been proposed a thermal head in which the glaze layer 12 is divided into parts for the respective heat-generating elements 13 (see, for example, Japanese Utility Model Application Laid-Open Specification No. 102051/81).

However, in this thermal heat having the glaze layer 12 divided into parts for the respective heat-generating elements 13, heat generated by one heat-generating element 13 is absorbed only in the glaze layer 12 just below this heat-generating element 13, and the quantity of absorbed heat is small and the rising response characteristics of the heat-generating elements 13 are improved. However, since the contact area between the glaze layer 12 and the substrate 11 is very narrow, conduction of heat absorbed in the glaze layer 12 to the substrate 11 is poor and a long time is required for reduction of the temperature. Accordingly, the falling response characteristics of the heat-generating elements 13 are bad, and the printing density obtained in case of continuous printing is greatly different from the printing density obtained when printing is carried out at intervals.

SUMMARY OF THE INVENTION

We made research with a view to overcoming the above-mentioned defects of the conventional techniques and as the result, it was found that if grooves having a depth of 0.3 to 30 $\mu m$, which extend to the midway of the thickness of the glaze layer, are formed in the surface portion of the glaze layer between every two adjacent heat-generating elements, adjacent heat-generating elements can be thermally separated from one another to improve the rising characteristics of the heat-generating temperature in each heat-generating element, and simultaneously, the bottom face of the glaze layer can be contacted with the substrate over a broad area and the falling response characteristics of the heat-generating temperature can be improved.

It is therefore a primary object of the present invention to provide a thermal head in which the rising and falling response characteristics of the heat-generating temperature are improved and the quality of prints is excellent.

In accordance with the present invention, there is provided a thermal head comprising a plurality of heat-generating elements formed on the surface of a glaze layer on a substrate, wherein grooves extending to the midway of the glaze layer in the thickness direction thereof and having a depth of 0.3 to 30 $\mu m$ are formed in the glaze layer between every two adjacent heat-generating elements.

Figure 1:
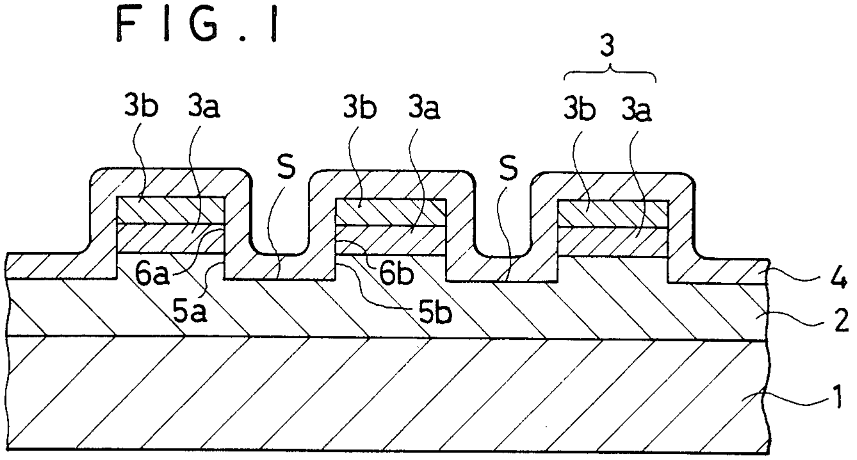
FIG. 1 is a view showing the longitudinal section of an embodiment of the thermal head according to the present invention.
Figure 2:
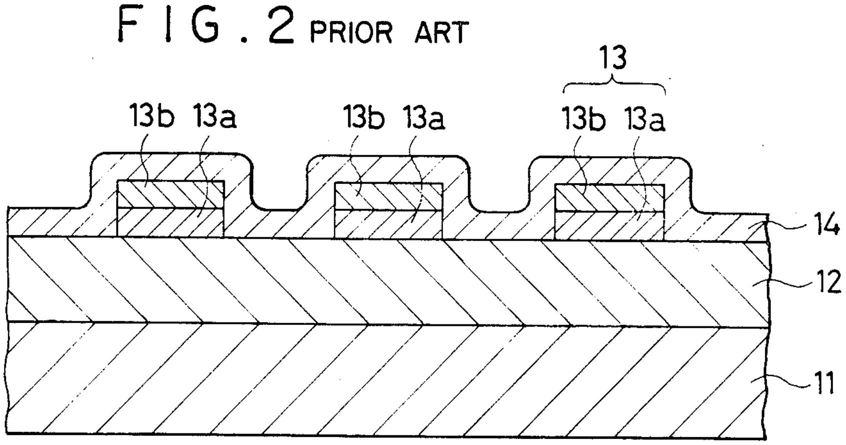
FIG. 2 PRIOR ART
FIG. 2 is a view showing the longitudinal section of a conventional thermal head.
Figure 3:
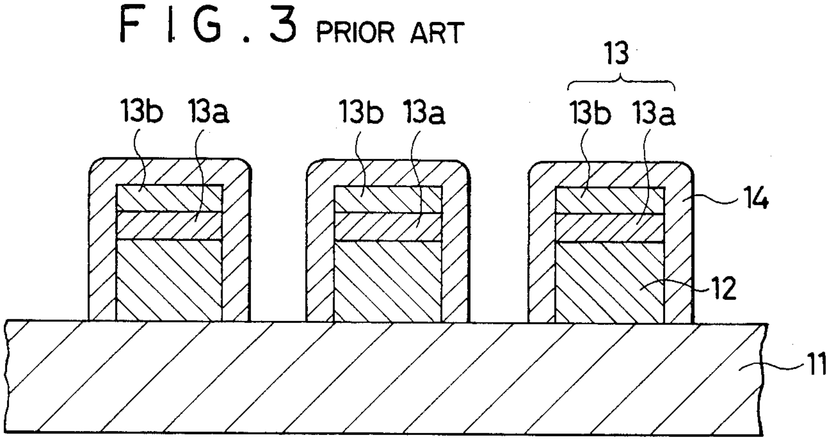
FIG. 3 PRIOR ART
FIG. 3 is a view showing the longitudinal section of another conventional thermal head.

In the drawings, each of reference numerals 1 and 11 represents a substrate, each of reference numerals 2 and 12 represents a glaze layer, each of reference numerals 3 and 13 represents a heat-generating element, and symbol S represents a groove.

DETAILED DESCRIPTION OF THE PREFERRED EMBODIMENTS

The present invention will now be described in detail with reference to the embodiment shown in FIG. 1.

FIG. 1 is a sectional view showing one embodiment of the thermal head according to the present invention. Reference numeral 1 represents a substrate composed of a ceramic such as alumina ($Al_2O_3$), and reference numeral 2 represents a glaze layer 2.

The glaze layer 2 is formed of a glass composed mainly of silica ($SiO_2$) and has a thermal expansion coefficient which is substantially equal to that of the substrate. The glaze layer 2 is formed on the substrate 1 in a thickness of about 35 to about 50 $\mu m$.

Heat-generating resistors 3*a* composed of a material having a high resistance, such as tantalum nitride ($Ta_2N$) or titanium oxide (TiO), and pairs of electrodes 3*b* (only one electrode is shown) composed of a good electric conductor such as aluminum (Al) or gold (Au) are formed on the glaze layer 2. A heat-generating element is constructed by the resistor 3*a* and electrode 3*b*. Pluralities of heat-generating resistors 3*a* and electrodes 3b are formed on the glaze layer 2 according to the known vacuum evaporation deposition method, sputtering method or etching method.

In the present invention, it is important that grooves extending to the midway of the glaze layer 2 in the thickness direction thereof and having a depth of 0.3 to 30 μm should be formed in the surface portion of the glaze layer 2 between every two adjacent heat-generating elements. In the embodiment shown in FIG. 1, grooves S having a depth of 0.3 to 30 μm are formed between every two adjacent heat-generating elements 3. If grooves having a depth of 0.3 to 30 μm are formed between every two adjacent heat-generating elements 3, every two adjacent heat-generating elements 3 can be thermally separated from each other and thermal influences on the respective heat-generating elements 3 can be avoided. Moreover, since the volume of the glaze layer 2 just below the heat-generating element 3 is small, the rising response characteristics of the heat-generating temperature of the heat-generating element 3 are improved. Furthermore, since all the bottom face of the glaze layer 2 is contacted with the insulating substrate 1, the heat of the heat-generating element 3 is conducted to the substrate 1 very well and accumulation of heat in the glaze layer 2 below the heat-generating element 3 is effectively prevented to improve the falling response characteristics of the temperature of the heat-generating element 3.

If the depth of the grooves S is smaller than 0.3 μm, sufficient thermal separation can not be attained between adjacent het-generating elements 3, and the rising response characteristics of the heat-generating temperature are degraded. If the depth of the grooves S is larger than 30 μm, the contact area between the glaze layer 2 and the substrate 1 is reduced and conduction of heat to the substrate 1 from the glaze layer 2 is not sufficiently performed, and therefore, the falling response characteristics of the heat-generating temperature are degraded. Accordingly, in order to improve both the rising and falling response characteristics of the heat-generating temperature, it is necessary that the depth of the grooves in the surface portion of the glaze layer 2 should be adjusted to between 0.3 to 30 μm.

In order to attain the object of the present invention, it is preferred that the ratio d/t of the groove depth d to the thickness t of the glaze layer be in the range of from 0.01 to 0.60, especially from 0.1 to 0.3. The width of the grooves S formed in the surface portion of the glaze layer can be changed in a broad range, but it is preferred that the groove width be 5 to 100 μm, especially 8 to 50 μm.

In accordance with a most preferred embodiment of the present invention, one side wall 5*a* of the groove S and the side wall 6*a* of one heat-generating element 3*a* or 3*b* are substantially on the same plane in the direction vertical to the substrate, and the other side wall 3*b* of the groove S and the side wall 6*b* of the heat-generating element adjacent to said one heat-generating element are substantially on the same plane in the direction vertical to the substrate. By adoption of this structure, the rising response characteristics of the heat-generating temperature are most prominently improved.

A thermal head having this structure may be prepared by (i) preparing a laminate comprising a ceramic substrate 1, a glaze layer 2, a heat-generating resistor layer 3*a* and an electrode film 3*b*, (ii) forming a photoresist film on the electrode film layer of the laminate and performing light exposure and development to form a pattern of the photoresist film, (iii) completely etching the exposed electrode film and heatgenerating resistor layer through the photoresist film to form electrodes and heat-generating resistors arranged at small intervals in the longitudinal direction of the glaze layer, and (iv) partially etching the exposed glaze layer to form grooves.

The photoresist film is exposed to light and developed so that a pattern corresponding to the arrangement pattern of the heat-generating elements 3 shown in FIG. 1 is formed. A known photoresist polymeric material, such as a photodimerization type photosensitive polymer, a photopolymerization type photosensitive polymer, a photodecomposition type photosensitive polymer or a polymer composition comprising a photoreactive compound such as an azide compound may be used for formation of the photoresist film.

At the etching step, a mixed acid of phosphoric acid and nitric acid may be used for removing the electrode film and hydrofluoric acid may be used for removing the heat-generating resistor layer. Moreover, an aqueous solution of a mixed acid having a hydrofluoric acid and nitric acid may be used for etching the glaze layer.

Finally, the photoresist film is removed to obtain a thermal head of the present invention.

It is preferred that the glaze layer be composed of a glass composition comprising 60% by weight of $SiO_2$, 8% by weight of BeO, 8% by weight of $Al_2O_3$, 8% by weight of CaO, about 2% by weight of $ZrO_2$, about 2% by weight of ZnO and about 2% by weight of $SrO_2$, and that the glaze layer should have a heat conductivity of 0.0196 cal/cm deg sec and a linear thermal expansion coefficient of $67.4\times10^{-7}$/°C.

For formation of grooves in the glaze layer, there can also be adopted a method in which a second glaze layer is laminated on the surface of the first glaze layer only just below the heat-generating elements.

Furthermore, a protecting layer 4 composed of tantalum pentoxide ($Ta_2O_5$/ is formed on the surfaces of the heat-generating elements 3 and the surface of the glaze layer 2.

The scope of the present invention is not limited by the foregoing embodiments but various modifications can be made without departing from the gist of the present invention.

As is apparent from the foregoing description, according to the present invention, by forming grooves extending to the midaway of the glaze layer in the thickness direction thereof and having a depth of 0.3 to 30 μm in the surface portion of the glaze layer between every two adjacent heat-generating elements, every two adjacent heat-generating elements can be thermally separated from each other and the contact area between the substrate and glaze layer can be increased. Accordingly, there can be provided a thermal head in which the rising and falling response chracteristics of the heat-generating temperature can be highly improved and prints having an excellent quality can be obtained.

We claim:

1. A thermal head comprising a substrate layer, a glaze layer formed on one surface of the substrate layer and a plurality of heat-generating elements formed on the surface of the glaze layer, each heat-generating element comprising a heat-generating resistor and a pair of electrodes connected in series to the heat-generating resistor, wherein the glaze layer is provided with grooves between every two adjacent heat-generating elements, the grooves extending into the glaze layer to a depth of 0.3 to 30 μm.

2. A thermal head as set forth in claim 1, wherein the substrate is an alumina ceramic substrate.

3. A thermal head as set forth in claim 1, wherein the glaze layer is formed of a glass composition comprising silica as the main component and having a thermal expansion coefficient which is substantially equal to that of the substrate.

4. A thermal head as set forth in claim 1, wherein the glaze layer has a thickness t of 35 to 50 μm and the ratio d/t of the groove depth d to the thickness t of the glaze layer is in the range of from 0.01 to 0.60.

5. A thermal head as set forth in claim 1, wherein the grooves have a width of 5 to 100 μm.

6. A thermal head as set forth in claim 1, wherein one side wall of the groove and the side wall of one heat-generating element are substantially on the same plane in the direction vertical to the substrate and the other side wall of the groove and the side wall of the heat-generating element adjacent to said one heat-generating element are substantially on the same plane in the direction vertical to the substrate.

7. A process for obtaining a thermal head that includes: a substrate; a glaze layer formed on one surface of the substrate; a plurality of heat-generating elements formed on the surface of the glaze layer, each heat-generating element comprising a heat-generating resistor and a pair of electrodes connected in series to the heat-generating resistor; a protective layer formed on the surfaces of the heat-generating elements and the surface of the glaze layer; and wherein the glaze layer includes grooves formed therein, the grooves extending into the glaze layer a depth of 0.3 to 30 μm and located between every two adjacent heat-generating elements, a side wall of the groove and a side wall of a first heat-generating element being substantially in the same plane in the direction vertical to the substrate and another side wall of the groove and side wall of a second heat-generating element adjacent to said first heat-generating element being substantially in the same plane in the direction vertical to the substrate, the process for obtaining the thermal head comprising the steps of:

(i) providing a laminate comprising a ceramic substrate, a glaze layer, a heat-generating resistor layer, and an electrode film layer, (ii) forming a pattern of photoresist film on the electrode film layer, (iii) etching the exposed electrode film and heat-generating resistor layer thereby forming electrodes and heat-generating resistors arranged at small intervals in the longitudinal direction of the glaze layer, and (iv) partially etching the exposed glaze layer to form grooves.

* * * * *